United States Patent
Zheng et al.

(10) Patent No.: US 12,219,508 B2
(45) Date of Patent: Feb. 4, 2025

(54) WIRELESS AUDIO SYNCHRONIZATION METHOD, WIRELESS AUDIO PLAYBACK DEVICE AND WIRELESS AUDIO TRANSCEIVING SYSTEM

(71) Applicant: TELINK SEMICONDUCTOR (SHANGHAI) CO., LTD., Shanghai (CN)

(72) Inventors: Mingjian Zheng, Shanghai (CN); Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 342 days.

(21) Appl. No.: 17/894,440

(22) Filed: Aug. 24, 2022

(65) Prior Publication Data
US 2023/0069368 A1 Mar. 2, 2023

(30) Foreign Application Priority Data
Aug. 24, 2021 (CN) .......................... 202110972677.1

(51) Int. Cl.
*H04W 56/00* (2009.01)
*H04L 65/70* (2022.01)
*H04R 5/04* (2006.01)

(52) U.S. Cl.
CPC .......... *H04W 56/001* (2013.01); *H04L 65/70* (2022.05); *H04R 5/04* (2013.01); *H04R 2420/07* (2013.01)

(58) Field of Classification Search
None
See application file for complete search history.

(56) References Cited

U.S. PATENT DOCUMENTS

| 5,757,870 A | 5/1998 | Miya et al. |
| 6,118,770 A | 9/2000 | Pianka et al. |

(Continued)

FOREIGN PATENT DOCUMENTS

| CN | 110290412 A | 9/2019 |
| CN | 112130616 A | 12/2020 |

(Continued)

OTHER PUBLICATIONS

Chinese Office Action mailed Apr. 29, 2024 in Chinese Application No. 202110972677.1, with English translation, 13 pages.

(Continued)

*Primary Examiner* — Phirin Sam
(74) *Attorney, Agent, or Firm* — Nixon & Vanderhye P.C.

(57) ABSTRACT

Provided is a wireless audio synchronization method, a wireless audio playback device and a wireless audio transceiving system. The method includes sampling based on a first local clock signal of the wireless audio playback device a received wireless signal; determining a peak moment corresponding to a current wireless data packet; counting based on the first local clock signal a time difference between peak moments corresponding to the current and previous wireless data packets and adjusting a clock cycle of the first local clock signal based on a counting result so that the counting result approaches a predetermined count value; and playing after a predetermined number of clock cycles of the first local clock signal the data segment or its preset part according to a second local clock signal of the wireless audio playback device, where there is a fixed frequency multiple relationship between the first and second local clock signals.

7 Claims, 2 Drawing Sheets

(56) References Cited

U.S. PATENT DOCUMENTS

| | | | |
|---|---|---|---|
| 6,628,737 B1 | 9/2003 | Timus | |
| 7,826,578 B1 | 11/2010 | Melanson et al. | |
| 11,514,777 B2* | 11/2022 | Frank | H04B 11/00 |
| 2001/0046241 A1 | 11/2001 | Shimosakoda | |
| 2014/0009564 A1 | 1/2014 | Cleve et al. | |
| 2017/0069338 A1 | 3/2017 | Elliot et al. | |
| 2019/0302222 A1* | 10/2019 | Bradley | G01S 5/18 |
| 2020/0105128 A1* | 4/2020 | Frank | H04B 11/00 |
| 2023/0148098 A1* | 5/2023 | Frank | H04L 27/34 |
| | | | 367/137 |

FOREIGN PATENT DOCUMENTS

| | | |
|---|---|---|
| EP | 1 037 420 A2 | 9/2000 |
| WO | WO 2012/105370 A1 | 8/2012 |
| WO | WO 2021/131582 A1 | 7/2021 |

OTHER PUBLICATIONS

Kim et al., "Precise Synchronization Mechanism in Wireless Devices," Samsung Electronics Co., Ltd., Apr. 5, 2018, 4 pages.
Extended European Search Report mailed Jan. 17, 2023 in European Application No. 22191420.3, 10 pages.
Eldon, John, "Applications of the Digital Correlator," vol. 12, No. 4, London, Great Britain, May 1, 1988, pp. 214-223.
Shark et al., "New High-Speed Adaptive Frame Synchronisers Incorporating Postdetection Processing Techniques," IEE Proceedings-I, Solid State & Electron Devices, Institution of Electrical Engineers, vol. 138, No. 4, Aug. 1, 1991, pp. 269-279.

\* cited by examiner

| 101 | Sampling, based on a first local clock signal of the wireless audio playback device, a received wireless signal to acquire a sample sequence, and demodulating the sample sequence to acquire a wireless data packet comprising a synchronization segment and a data segment, wherein the synchronization segment comprises a synchronization sequence having a fixed pattern, the data segment comprises coded audio data, and the wireless signal is transmitted by a wireless audio transmitting device regularly according to a local clock signal of the wireless audio transmitting device |

| 102 | Performing similarity matching on subsequences extracted from the sample sequence using a time sliding window, with a preset local synchronization sequence of the wireless audio playback device, and determining a peak moment corresponding to a maximum one of a plurality of matching values acquired by the similarity matching, wherein each of the subsequences has the same length as the preset synchronization sequence, and the preset synchronization sequence corresponds to a fixed position of the synchronization segment |

| 103 | Counting, based on the first local clock signal, a time difference between peak moments respectively corresponding to current and previous wireless data packets, and adjusting a clock cycle of the first local clock signal based on a result of the counting so that the result of the counting of the time difference between two adjacent peak moments approaches a predetermined count value |

| 104 | Playing, after a predetermined number of clock cycles of the first local clock signal from the peak moment corresponding to the current wireless data packet, the data segment or a preset part thereof according to a second local clock signal of the wireless audio playback device, wherein there is a fixed frequency multiple relationship between the first local clock signal and the second local clock signal |

FIG. 1

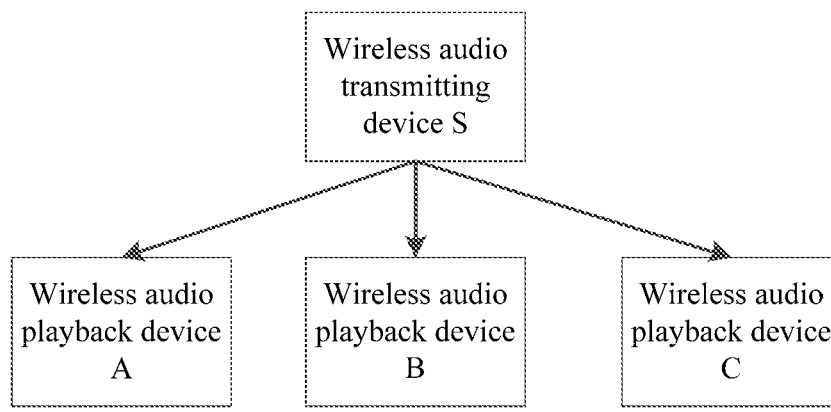

FIG. 2

WIRELESS AUDIO SYNCHRONIZATION METHOD, WIRELESS AUDIO PLAYBACK DEVICE AND WIRELESS AUDIO TRANSCEIVING SYSTEM

CROSS-REFERENCE TO RELATED PATENT APPLICATION

The present disclosure claims the benefit of and priority to Chinese Patent Application No. 202110972677.1 filed on Aug. 24, 2021, the entire disclosure of which is incorporated by reference herein.

TECHNICAL FIELD

The present disclosure relates to the field of audio signal processing and wireless communication technologies, and in particular relates to a method of wireless audio synchronization, a wireless audio playback device and a wireless audio transceiving system.

BACKGROUND

A wireless audio transceiving system typically includes a wireless audio transmitting device and a plurality of wireless audio playback devices. The plurality of wireless audio playback devices may for example be left and right earbuds, or for example be a plurality of wireless speakers. The sound quality may be degraded if audio playback in the respective wireless audio playback devices is out of sync.

Currently, the existing audio synchronization methods are mostly implemented by exchanging clock signals between the wireless audio playback devices. However, those audio synchronization methods are limited in time accuracy and require additional control data interaction.

SUMMARY

An object of the present disclosure is to provide a method of wireless audio synchronization, a wireless audio playback device and a wireless audio transceiving system to at least partially solve technical problems of the prior art. In the present disclosure, it is unnecessary to transmit time control data between the playback devices or between the transmitting device and the playback device, and what is required is only to perform local automatic adjustment based on reception time of the wireless data packet that contains the audio data and is supposed to be transmitted. In addition, a high-speed clock required in RF reception is adopted in the present disclosure for determining and adjusting the time error of the audio signal, which has a higher precision than the time synchronization as performed in common practice based on the audio signal per se.

In order to solve the aforesaid technical problem, the present disclosure adopts the following technical solution that is a method of wireless audio synchronization, applicable to a wireless audio playback device, including:

sampling, based on a first local clock signal of the wireless audio playback device, a received wireless signal to acquire a sample sequence, and demodulating the sample sequence to acquire a wireless data packet, where the wireless data packet includes a synchronization segment and a data segment, the synchronization segment including a synchronization sequence having a fixed pattern, the data segment including coded audio data, and the wireless signal is transmitted by a wireless audio transmitting device regularly according to a local clock signal of the wireless audio transmitting device;

performing similarity matching on subsequences extracted from the sample sequence using a time sliding window, with a preset local synchronization sequence of the wireless audio playback device, and determining a peak moment corresponding to a maximum one of a plurality of matching values acquired by the similarity matching, where each of the subsequences has the same length as the preset synchronization sequence, and the preset synchronization sequence corresponds to a fixed position of the synchronization segment;

counting, based on the first local clock signal, a time difference between peak moments respectively corresponding to a current wireless data packet and a previous wireless data packet, and adjusting a clock cycle of the first local clock signal based on a result of the counting so that the result of the counting of the time difference between two adjacent peak moments approaches a predetermined count value; and playing, after a predetermined number of clock cycles of the first local clock signal from the peak moment corresponding to the current wireless data packet, the data segment or a preset part thereof according to a second local clock signal of the wireless audio playback device, where there is a fixed frequency multiple relationship between the first local clock signal and the second local clock signal.

In order to solve the aforesaid technical problem, the present disclosure adopts the following technical solution that is a wireless audio playback device including:

a sampling and demodulating module configured to sample, based on a first local clock signal of the wireless audio playback device, a received wireless signal to acquire a sample sequence, and demodulate the sample sequence to acquire a wireless data packet, where the wireless data packet includes a synchronization segment and a data segment, the synchronization segment including a synchronization sequence having a fixed pattern, the data segment including coded audio data, and the wireless signal is transmitted by a wireless audio transmitting device regularly according to a local clock signal of the wireless audio transmitting device;

a matching module configured to perform similarity matching on subsequences extracted from the sample sequence using a time sliding window, with a preset local synchronization sequence of the wireless audio playback device, and determine a peak moment corresponding to a maximum one of a plurality of matching values acquired by the similarity matching, where each of the subsequences has the same length as the preset synchronization sequence, and the preset synchronization sequence corresponds to a fixed position of the synchronization segment;

an adjusting module configured to count, based on the first local clock signal, a time difference between peak moments respectively corresponding to a current wireless data packet and a previous wireless data packet, and adjust a clock cycle of the first local clock signal based on a result of the counting so that the result of the counting of the time difference between two adjacent peak moments approaches a predetermined count value; and a playing module configured to play, after a predetermined number of clock cycles of the first local clock signal from the peak moment corresponding to the current wireless data packet, the data segment or a preset part thereof according to a second local clock signal of the wireless audio playback device, where there is a fixed frequency multiple relationship between the first local clock signal and the second local clock signal.

In order to solve the aforesaid technical problem, the present disclosure adopts the following technical solution that is a wireless audio playback device including: a memory and a processor, where the memory has instructions stored therein, and the instructions, when executed by the processor, cause the processor to perform the aforesaid method of wireless audio synchronization.

In order to solve the aforesaid technical problem, the present disclosure adopts the following technical solution that is a wireless audio transceiving system including a wireless audio transmitting device and a plurality of the aforesaid wireless audio playback devices, where the wireless audio transmitting device is configured to transmit a wireless signal to each of the wireless audio playback device regularly based on a local clock signal of the wireless audio transmitting device; each of the wireless audio playback devices is configured to sample and demodulate the wireless signal to acquire a wireless data packet, where the wireless data packet includes a synchronization segment and a data segment, the synchronization segment including a synchronization sequence having a fixed pattern, the data segment including coded audio data, and as time elapses, a counting result of a time difference between two adjacent peak moments of each wireless audio playback device approaches the same predetermined count value, and clock cycles of second local clock signals of the wireless audio playback devices tend to be the same.

Compared with the prior art, the present disclosure has following beneficial effects. No additional synchronization information is required, and the time between the wireless audio transmitting device and the playback device may be synchronized directly through the transmitting and receiving of wireless data packets that are originally required for transmitting the audio data. Furthermore, as the number of wireless packets received by the wireless audio playback device increases, the product of the predetermined count value and the clock cycle of the first local clock signal of the wireless audio playback device may tend to be identical with the transmitting cycle of the wireless packet transmitted by the wireless audio transmitting device. Since the plurality of wireless audio playback devices are well synchronized with the wireless audio transmitting device, the synchronization between the respective playback devices may also achieve a more desirable effect. For example, the clock cycles of the first local clock signals of the wireless audio playback devices A and B tend to be the same. In general, the distance between the wireless audio transmitting device and each wireless audio playback device is not great, or the difference in distance is not great. Thus, considering that the speed of electromagnetic wave propagation is the speed of light, the time difference caused by the physical distance can be ignored. The moment when the wireless audio playback device A starts to play the audio content of the wireless data packet tends to be the same as the moment when the wireless audio playback device B starts to play the audio content of the same wireless data packet. Since the clock cycles of the second local clock signals of the wireless audio playback devices A and B tend to be equal to each other, the speed at which the two playback devices play the audio content of the same wireless data packet may also tend to be equal to each other. Thus, the wireless audio playback device A and the wireless audio playback device B can play the content synchronously without exchanging the clock signals therebetween. The time difference between the two playback devices A and B in playing the audio content of the same wireless data packet will not exceed at most one clock cycle of the first local clock signal. In general, the clock cycle of the first local clock signal is in the unit of microseconds or even lower. Thus, the audio synchronization has a rather high precision.

BRIEF DESCRIPTION OF THE DRAWINGS

FIG. 1 is a schematic flowchart of a method of wireless audio synchronization according to an embodiment of the present disclosure;

FIG. 2 is a structural block diagram of a wireless audio transceiving system according to an embodiment of the present disclosure;

DETAILED DESCRIPTION

In the present disclosure, it should be understood that terms such as "include" or "have" are intended to indicate the existence of characteristics, digits, steps, actions, components, parts disclosed by the specification or any combination thereof, without excluding the existence of one or more other characteristics, digits, steps, actions, components, parts or any combination thereof.

Furthermore, it should be noted that, in the case of no conflict, the embodiments of the present disclosure and features of the embodiments may be combined with each other in any manner. The present disclosure will be described in detail below with reference to the accompanying drawings and embodiments.

The present disclosure will be further described in detail below in conjunction with embodiments shown by the accompanying drawings.

Referring to FIG. 1, embodiments of the present disclosure provide a method of wireless audio synchronization, which is applicable to a wireless audio playback device and includes following steps.

Step 101: a received wireless signal is sampled based on a first local clock signal of the wireless audio playback device to acquire a sample sequence, and the sample sequence is demodulated to acquire a wireless data packet. The wireless data packet includes a synchronization segment and a data segment, where the synchronization segment includes a synchronization sequence having a fixed pattern, and the data segment includes coded audio data. The wireless signal is transmitted by a wireless audio transmitting device regularly according to a local clock signal of the wireless audio transmitting device.

Referring to FIG. 2, the wireless audio transmitting device S transmits the same wireless data packet to the wireless audio playback devices A, B and C regularly (e.g., transmitting one wireless data packet every 10 ms) according to its local clock signal. Specifically, the present disclosure does not limit the modulation method of the wireless audio signal. The data segment in the wireless data packet may be divided into a plurality of segments, and each wireless audio playback device A, B and C may play one of the segments respectively. The audio content of the data segment of the wireless packet may also be unsegmented, such that the content as played by the wireless audio playback devices A, B and C is the same.

Figure 3:
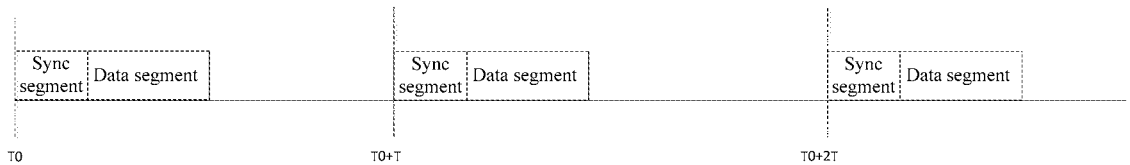
FIG. 3 is a timing diagram for a wireless audio transmitting device to transmit wireless data packets with according to an embodiment of the present disclosure.

Referring to FIG. 3, the wireless audio transmitting device transmits wireless data packets regularly in accordance with its local clock signal and a preset modulation method. The first part of the wireless data packet may for example be a synchronization segment, and the second part may be a data segment. In the example shown in FIG. 3, the wireless audio transmitting device starts transmitting the wireless packets at moments T0, T0+T, and T0+2T. Since the clock cycle of the local clock signal of the wireless audio transmitting device is fixed, the duration of its cycle T for transmitting the wireless data packets is also fixed.

Step 102: similarity matching is performed on subsequences extracted from the sample sequence using a time sliding window, with a preset local synchronization sequence of the wireless audio playback device, and a peak moment corresponding to a maximum one of a plurality of matching values acquired by the similarity matching is determined. Each of the subsequences has the same length as the preset synchronization sequence, and the preset synchronization sequence corresponds to a fixed position of the synchronization segment.

Figure 4:
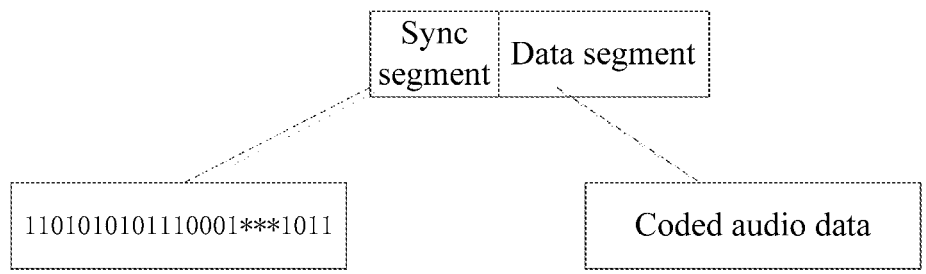
FIG. 4 is a schematic diagram of a method for a wireless audio playback device to find relevant peaks according to an embodiment of the present disclosure.

FIG. 4 shows the content of the synchronization segment when the synchronization sequence is assumed to be binary bits, which is "1101010101110001*1011". For the sake of explanation, it is assumed that the sample sequence is also "11010101110001*1011".

The length of the time sliding window is, for example, 7 (for the sake of explanation only, and the actual length of the time sliding window is likely to be much greater). The preset synchronization sequence is for example "1110001". The code sequence extracted using the time sliding window for the first time from the sample sequence of the synchronization segment is "1101010"; and the time sliding window then slides one bit to extract the code sequence "1010101" from the sample sequence of the synchronization segment. The algorithm for similarity matching between two binary codes may for example be implemented by counting the binary data bits with the same value at the corresponding position, and the specific manner is not limited to this. Obviously, when the sliding time window slides to the tenth bit of the sample sequence of the synchronization segment, a maximum similarity matching value can be acquired; and this moment serves as a peak moment. The peak moment at this point may for example be defined as the sampling moment of the last sampling value corresponding to the maximum matching value when the sample sequence is fully matched.

It should be noted here that the sample sequence is adopted here in the binary form only for explanation. In practice, it is more likely that both the local preset synchronization sequence and the sample sequence to be matched are non-single-bit values. For example, if the sample sequence is obtained from a 12-bit ADC sample, each value in the sample sequence is a 12-bit value. Accordingly, a plurality of 12-bit values may form a preset synchronization sequence, rather than a preset synchronization sequence formed by a sequence of single-bit values.

Furthermore, each bit in the synchronization sequence in a real system may have different sampling values. For example, if the original bit sequence is 1010 and the actual system is upsampled by a factor of 4, the corresponding sampling value may be "210 230 250 210 20 10 5 15 200 220 240 230 25 15 3 12". Assuming that the preset synchronization sequence is "250 5 240 3", it means that the third oversampling point at the sampling moment is the best sampling point.

Step 103: a time difference between peak moments respectively corresponding to a current wireless data packet and a previous wireless data packet is counted based on the first local clock signal, and a clock cycle of the first local clock signal is adjusted based on a result of the counting so that the result of the counting of the time difference between two adjacent peak moments approaches a predetermined count value.

For example, referring to the explanation of FIG. 2, the predetermined count value is the count value corresponding to 10 milliseconds.

Specifically, both the wireless audio transmitting device and the wireless audio playback device have a local clock for measuring the local time. Although they are nominally set to have the same frequency value such as 48 Mhz, an error actually occurs. When the counting result of the time difference between two adjacent peak moments is equal to the predetermined count value, the local clock cycle of the wireless audio playback device and the local clock cycle of the wireless audio transmitting device are identical.

Step 104: after a predetermined number of clock cycles of the first local clock signal from the peak moment corresponding to the current wireless data packet, the data segment or a preset part thereof is played according to a second local clock signal of the wireless audio playback device. There is a fixed frequency multiple relationship between the first local clock signal and the second local clock signal.

As the number of wireless packets received by the wireless audio playback device increases, the product of the predetermined count value and the clock cycle of the first local clock signal of the wireless audio playback device may tend to be identical with the transmitting cycle of the wireless packet transmitted by the wireless audio transmitting device. For example, the clock cycles of the first local clock signals of the wireless audio playback devices A and B tend to be the same. In general, the distance between the wireless audio transmitting device and each wireless audio playback device is not great, or the difference in distance is not great. Thus, considering that the speed of electromagnetic wave propagation is the speed of light, the time difference caused by the physical distance can be ignored. The moment when the wireless audio playback device A starts to play the audio content of the wireless data packet tends to be the same with the moment when the wireless audio playback device B starts to play the audio content of the same wireless data packet; and the time difference between the two playback devices does not exceed at most one clock cycle of the first local clock signal. Since the clock cycles of the second local clock signals of the wireless audio playback devices A and B tend to be equal to each other, the speed at which the two playback devices play the audio content of the same wireless data packet may also tend to be equal to each other. Thus, the wireless audio playback device A and the wireless audio playback device B can play the content synchronously without exchanging the clock signals therebetween. The time difference between the two playback devices A and B in playing the audio content of the same wireless data packet will not exceed at most one clock cycle of the first local clock signal. In general, the clock cycle of the first local clock signal is in the unit of microseconds or even lower. Thus, the audio synchronization has a rather high precision.

In some embodiments, counting, based on the first local clock signal, the time difference between the peak moments respectively corresponding to the current wireless data packet and the previous wireless data packet, and adjusting the clock cycle of the first local clock signal based on the result of the counting so that the result of the counting of the time difference between two adjacent peak moments approaches the predetermined count value includes:

shortening the clock cycle of the first local clock signal when the result of the counting is less than the predetermined count value; and lengthening the clock cycle of the first local clock signal when the result of the counting is greater than the predetermined count value.

Specifically, the first local clock signal and the second local clock signal are both acquired by reducing frequency by a fixed multiple based on a reference clock signal, and the reference clock signal is generated by a phase-locked loop based on clock signals of a local crystal oscillator, such that the clock cycle of the first local clock signal is adjusted by adjusting a clock cycle of the local crystal oscillator.

Specifically, the local crystal oscillator is connected to a matching circuit, and the clock cycle of the local crystal oscillator may be changed, for example, by adjusting the capacitance value of the capacitor in the matching circuit. Of course, those skilled in the art may change the clock cycle of the local crystal oscillator according to other known technologies, which is not defined in the present disclosure. The circuit form of the matching circuit may also be determined by known technologies, which will not be repeated in the present disclosure.

The clock frequency of the local crystal oscillator may be increased or decreased, the clock frequency of the first local clock signal and the second local clock signal are both increased or decreased in equal proportion. For example, if the clock frequency of the local crystal oscillator increases by 1%, the clock frequency of the first local clock signal increases by 1%, and the clock frequency of the second local clock signal increases by 1%. For example, if the clock frequency of the local crystal oscillator decreases by 1%, the clock frequency of the first local clock signal decreases by 1%, and the clock frequency of the second local clock signal decreases by 1%.

Of course, the clock cycles of the first local clock signal and the second local clock signal may also be adjusted by changing the number of cycles of the reference clock signal contained in one clock cycle of the local first local clock signal and the second local clock signal of the wireless audio playback device.

Figure 5:
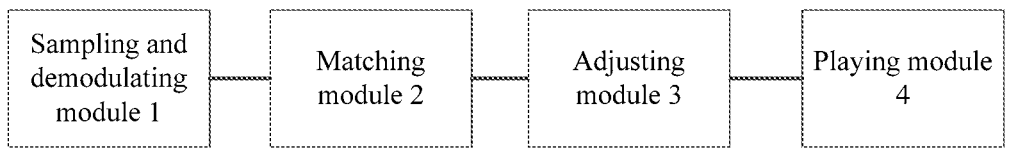
FIG. 5 is a structural block diagram of a wireless audio playback device according to an embodiment of the present disclosure.

Based on the same inventive concept, referring to FIG. 5, embodiments of the present disclosure further provide a wireless audio playback device, which includes a sampling and demodulating module 1, a matching module 2, an adjusting module 3 and a playing module 4.

The sampling and demodulating module 1 is configured to sample, based on a first local clock signal of the wireless audio playback device, a received wireless signal to acquire a sample sequence, and demodulate the sample sequence to acquire a wireless data packet. The wireless data packet includes a synchronization segment and a data segment, where the synchronization segment includes a synchronization sequence having a fixed pattern, and the data segment includes coded audio data. The wireless signal is transmitted by a wireless audio transmitting device regularly according to a local clock signal of the wireless audio transmitting device.

The matching module 2 is configured to perform similarity matching on subsequences extracted from the sample sequence using a time sliding window, with a preset local synchronization sequence of the wireless audio playback device, and determine a peak moment corresponding to a maximum one of a plurality of matching values acquired by the similarity matching. Each of the subsequences has the same length as the preset synchronization sequence, and the preset synchronization sequence corresponds to a fixed position of the synchronization segment.

The adjusting module 3 is configured to count, based on the first local clock signal, a time difference between peak moments respectively corresponding to a current wireless data packet and a previous wireless data packet, and adjust a clock cycle of the first local clock signal based on a result of the counting so that the result of the counting of the time difference between two adjacent peak moments approaches a predetermined count value.

The playing module 4 is configured to play, after a predetermined number of clock cycles of the first local clock signal from the peak moment corresponding to the current wireless data packet, the data segment or a preset part thereof according to a second local clock signal of the wireless audio playback device. There is a fixed frequency multiple relationship between the first local clock signal and the second local clock signal.

In some embodiments, the adjusting module 3 is specifically configured to:

shorten the clock cycle of the first local clock signal when the result of the counting is less than the predetermined count value; and lengthen the clock cycle of the first local clock signal when the result of the counting is greater than the predetermined count value.

Specifically, the first local clock signal and the second local clock signal are both acquired by reducing frequency by a fixed multiple based on a reference clock signal, and the reference clock signal is generated by a phase-locked loop based on clock signals of a local crystal oscillator, such that the clock cycle of the first local clock signal is adjusted by adjusting a clock cycle of the local crystal oscillator.

Figure 6:
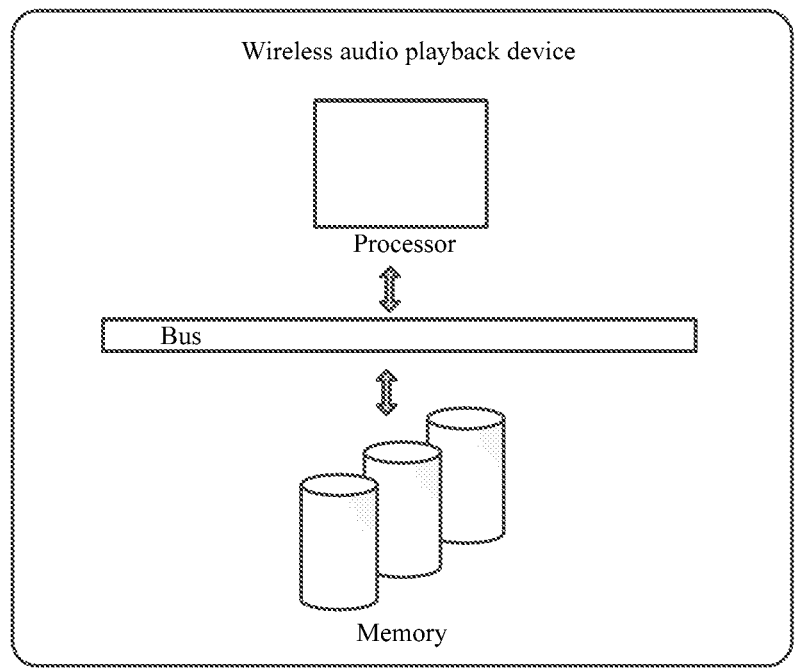
FIG. 6 is a structural block diagram of a wireless audio playback device according to another embodiment of the present disclosure.

Referring to FIG. 6, embodiments of the present disclosure provide a wireless audio playback device including: a memory and a processor. The memory has instructions stored therein, and the instructions, when executed by the processor, cause the processor to perform the aforesaid method of wireless audio synchronization.

It should be noted that the wireless audio playback device may further include a wireless RF transceiving module, an audio playing module, and a clock module. The wireless RF transceiving module is configured to transmit and receive a wireless signal; the audio playing module is configured to play the audio code; and the clock module is connected to a crystal oscillator to generate the various clock signals required in the wireless audio playback device. All these can be designed according to the prior art.

Embodiments of the present disclosure further provide a wireless audio transceiving system, which includes: a wireless audio transmitting device and a plurality of the aforesaid wireless audio playback devices. The wireless audio transmitting device is configured to transmit a wireless signal to each of the wireless audio playback devices regularly based on a local clock signal of the wireless audio transmitting device; and each of the wireless audio playback devices is configured to sample and demodulate each wireless signal to acquire a wireless data packet. The wireless data packet includes a synchronization segment and a data segment, where the synchronization segment includes a synchronization sequence having a fixed pattern, and the data segment includes coded audio data. As time elapses, the counting result of a time difference between two adjacent peak moments of each wireless audio playback device approaches the same predetermined count value, and clock cycles of second local clock signals of the wireless audio playback devices tend to be the same.

Following the previous example, the wireless audio playback devices A, B and C are all sampled precisely according to the first local clock signal of 48 MHz, and the clock cycle at which the three playback devices play the audio may be exactly the same.

The respective embodiments of the present disclosure are described in a progressive manner. The reference may be made to each other for the same or similar parts of the respective embodiments, and each embodiment focuses on the differences from other embodiments.

The protection scope of the present disclosure is not limited to the aforesaid embodiments, and obviously, one skilled in the art may make various modifications and variations to the present disclosure without departing from the scope of the present disclosure. If the modifications and variations of the present disclosure fall within the scope of the claims and their equivalents, the present disclosure is also intended to encompass such modifications and variations.

What is claimed is:

1. A method of wireless audio synchronization, applicable to a wireless audio playback device, comprising:
    sampling, based on a first local clock signal of the wireless audio playback device, a received wireless signal to acquire a sample sequence, and demodulating the sample sequence to acquire a wireless data packet comprising a synchronization segment and a data segment, wherein the synchronization segment comprises a synchronization sequence having a fixed pattern, the data segment comprises coded audio data, and the wireless signal is transmitted by a wireless audio transmitting device regularly according to a local clock signal of the wireless audio transmitting device;
    performing similarity matching on subsequences extracted from the sample sequence using a time sliding window, with a preset local synchronization sequence of the wireless audio playback device, and determining a peak moment corresponding to a maximum one of a plurality of matching values acquired by the similarity matching, wherein each of the subsequences has the same length as the preset synchronization sequence, and the preset synchronization sequence corresponds to a fixed position of the synchronization segment;
    counting, based on the first local clock signal, a time difference between peak moments respectively corresponding to a current wireless data packet and a previous wireless data packet, and adjusting a clock cycle of the first local clock signal based on a result of the counting so that the result of the counting of the time difference between two adjacent peak moments approaches a predetermined count value; and
    playing, after a predetermined number of clock cycles of the first local clock signal from the peak moment corresponding to the current wireless data packet, the data segment or a preset part thereof according to a second local clock signal of the wireless audio playback device, wherein there is a fixed frequency multiple relationship between the first local clock signal and the second local clock signal.

2. The method according to claim 1, wherein counting, based on the first local clock signal, the time difference between the peak moments respectively corresponding to the current wireless data packet and the previous wireless data packet, and adjusting the clock cycle of the first local clock signal based on the result of the counting so that the result of the counting of the time difference between two adjacent peak moments approaches the predetermined count value comprises:
    shortening the clock cycle of the first local clock signal when the result of the counting is less than the predetermined count value; and
    lengthening the clock cycle of the first local clock signal when the result of the counting is greater than the predetermined count value.

3. The method according to claim 2, wherein the first local clock signal and the second local clock signal are both acquired by reducing frequency by a fixed multiple based on a reference clock signal, and the reference clock signal is generated by a phase-locked loop based on clock signals of a local crystal oscillator, such that the clock cycle of the first local clock signal is adjusted by adjusting a clock cycle of the local crystal oscillator.

4. A wireless audio playback device, comprising:
    a sampling and demodulating module configured to sample, based on a first local clock signal of the wireless audio playback device, a received wireless signal to acquire a sample sequence, and demodulate the sample sequence to acquire a wireless data packet, wherein the wireless data packet comprises a synchronization segment and a data segment, the synchronization segment comprising a synchronization sequence having a fixed pattern, the data segment comprising coded audio data, and the wireless signal is transmitted by a wireless audio transmitting device regularly according to a local clock signal of the wireless audio transmitting device;
    a matching module configured to perform similarity matching on subsequences extracted from the sample sequence using a time sliding window, with a preset local synchronization sequence of the wireless audio playback device, and determine a peak moment corresponding to a maximum one of a plurality of matching values acquired by the similarity matching, wherein each of the subsequences has the same length as the preset synchronization sequence, and the preset synchronization sequence corresponds to a fixed position of the synchronization segment;
    an adjusting module configured to count, based on the first local clock signal, a time difference between peak moments respectively corresponding to a current wireless data packet and a previous wireless data packet, and adjust a clock cycle of the first local clock signal based on a result of the counting so that the result of the counting of the time difference between two adjacent peak moments approaches a predetermined count value; and
    a playing module configured to play, after a predetermined number of clock cycles of the first local clock signal from the peak moment corresponding to the current wireless data packet, the data segment or a preset part thereof according to a second local clock signal of the wireless audio playback device, wherein there is a fixed frequency multiple relationship between the first local clock signal and the second local clock signal.

5. The playback device according to claim 4, wherein the adjusting module is further configured to:

shorten the clock cycle of the first local clock signal when the result of the counting is less than the predetermined count value; and lengthen the clock cycle of the first local clock signal when the result of the counting is greater than the predetermined count value.

6. The playback device according to claim 5, wherein the first local clock signal and the second local clock signal are both acquired by reducing frequency by a fixed multiple based on a reference clock signal, and the reference clock signal is generated by a phase-locked loop based on clock signals of a local crystal oscillator, such that the clock cycle of the first local clock signal is adjusted by adjusting a clock cycle of the local crystal oscillator.

7. A wireless audio transceiving system, comprising a wireless audio transmitting device and a plurality of wireless audio playback devices according to claim 4, wherein the wireless audio transmitting device is configured to transmit a wireless signal to each of the wireless audio playback devices regularly based on a local clock signal of the wireless audio transmitting device; each of the wireless audio playback devices is configured to sample and demodulate the wireless signal to acquire a wireless data packet, wherein the wireless data packet comprises a synchronization segment and a data segment, the synchronization segment comprising a synchronization sequence having a fixed pattern, the data segment comprising coded audio data, and as time elapses, a counting result of a time difference between two adjacent peak moments of each wireless audio playback device approaches the same predetermined count value, and clock cycles of second local clock signals of the wireless audio playback devices tend to be the same.

* * * * *